United States Patent [19]
Rabe

[11] 3,987,698
[45] Oct. 26, 1976

[54] NAIL HAVING DEFORMED SHANK
[75] Inventor: Karl Lars Gunnar Rabe, Hagersten, Sweden
[73] Assignee: Nordisk Kartro Aktiebolag, Sweden
[22] Filed: Apr. 10, 1975
[21] Appl. No.: 566,703

[30] Foreign Application Priority Data
Apr. 10, 1974 Sweden .............................. 7404902

[52] U.S. Cl. .................................................. 85/21
[51] Int. Cl.² ......................................... F16B 15/06
[58] Field of Search ............... 85/21, 20, 22, 19, 44, 85/10 R

[56] References Cited
UNITED STATES PATENTS
1,774,846  9/1930  Rosenberg .............................. 85/21
2,269,708  1/1942  Dickson .............................. 85/21 X
2,650,032  8/1953  Godfrey .......................... 85/10 R X
2,819,641  1/1958  Corckran ................................ 85/21

Primary Examiner—Ramon S. Britts
Attorney, Agent, or Firm—Hill, Gross, Simpson, Van Santen, Steadman, Chiara & Simpson

[57] ABSTRACT

A nail has a series of embossments formed as wedge-like ramps arranged in a helical path between the head and tip of the nail, each embossment having a smaller end directed toward the nail tip, the cross-section of the shank being substantially constant.

4 Claims, 2 Drawing Figures

NAIL HAVING DEFORMED SHANK

BACKGROUND OF THE INVENTION

1. Field of the Invention

The invention relates to a nail, the shank of which has at least a part of its length formations for improving the holding force in wood or other material which due to its elasticity or in any other way may cooperate with the shank deformations to improve the holding force.

2. Prior Art

Nails having a deformed shank are known in various designs. Thus, for instance, so-called screw nails have been proposed, the shanks of which are provided with a thread formation, either by twisting or by a thread rolling operation. Further, so-called cam nails have been proposed, the shanks of which are provided with a plurality of ring-shaped cams, which are intended to serve as barbs. Normally, the shank is not deformed along its full length but only along the half or two-thirds of the length from the point. See U.S. Pat. No. 2,613,570.

SUMMARY OF THE INVENTION

According to the present invention, the deformed portion of the nail shank has a plurality of separate embossments which are so spaced circumferentially and longitudinally that the shank cross-section is essentially constant throughout the deformed portion. Since the deformed shank portion has separate embossments but still has an essentially constant cross-section throughout its length, the nail has an advantageous combination of properties with respect to holding force and penetration.

In the Drawings

One embodiment of the nail according to the invention is shown as an example in the enclosed drawing and is described in more detail below.

The nail is shown greatly enlarged and has a head 11, a shank 12 having a square or fluted cross-section, and a tip 13. The shank 12 is deformed from the tip 13 and along a portion of the shank, preferably along a portion which is between half and two-thirds of the full length of the shank. The shank portion adjacent the head is undeformed, except for at least two conventional transverse cams or ridges 14.

Figure 1:
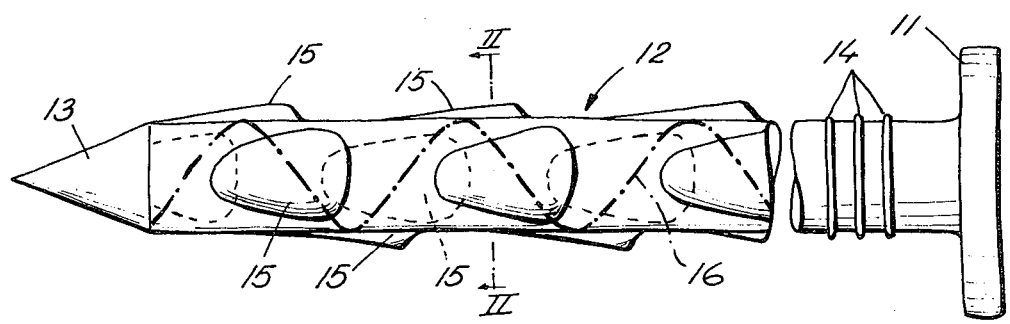
FIG. 1 is a fragmentary side view of a nail according to the invention.
Figure 2:
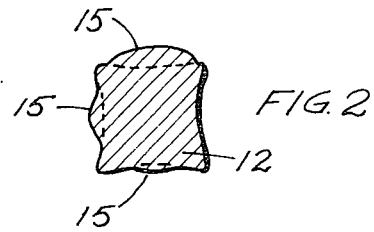
FIG. 2 is a cross-sectional view of the nail at the line II—II of FIG. 2.

The deformed shank has a plurality of mutually similar embossments 15. These embossments 15 are evenly spaced both circumferentially and longitudinally, and as shown in FIG. 1, when viewed from the side, the embossments are shaped as ramps or wedges, the tip of which is directed toward the nail tip 13. All the embossments are disposed along one and the same helix 16 and have a maximum extent circumferentially which is less than a fourth of the full shank circumference or perimeter.

The embossments 15 are so shaped and so spaced circumferentially and longitudinally of the deformed shank portion that all cross-sections of that shank portion are essentially congruent or at least have essentially the same area. This result may be accomplished with many combinations of shapes, dimensions and distributions of the embossments. Thus, the drawing merely shows an example to which the invention is not limited. Thus, within the scope of the invention, the embossments may be spaced along several helixes, the extent of the embossments circumferentially as well as longitudinally may be varied, and the embossments may be arranged with circumferential overlap.

The forming of the embossments 15 may advantageously be combined with another operational step which is necessary, such as the forming of the tip 13. Thus, the tool which is used in ordinary machines for the manufacture of fluted wire nails may be combined with a pressing tool which forms the embossments by a plastic deformation of the shank simultaneously with the forming of the tip. Thus, no separate operational step is required to form the embossments.

It is not necessary for the nail shank to have a square cross-section as in the embodiment shown, as it could also have a circular or other cross-section.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A one-piece nail comprising:
   a. an enlarged head;
   b. a pointed tip;
   c. a shank interconnecting said head and said tip, said shank having four longitudinally straight sides; and
   d. a series of uniform elongated protruding embossments, the direction of the elongation being parallel to the longitudinal axis of said shank, said embossments being disposed on said four sides and arranged in a single helical pattern in which pattern successive embossments are angularly offset 90° from each other, there being a space devoid of any embossment between any two adjacent embossments on any one side in longitudinal registration with an embossment on the opposite side, whereby the successive embossments in a helix of the pattern are disposed on adjacent ones of said sides with four embossments being in each revolution of the helix.

2. A nail according to claim 1 in which each embossment is a wedge-like ramp which blends smoothly around its entire periphery into one of said sides of said shank.

3. A nail according to claim 1 in which each embossment has one end facing said head and another end facing said tip, both of said ends blending smoothly into one of said sides of said shank.

4. A nail according to claim 1 in which the embossment length and the helix pitch are such that a longitudinal increment of said shank carrying only one embossment on one side carries only longitudinally spaced end portions of two of said embossments on the opposite side, and only a larger end portion of one embossment on each of the adjacent sides.

* * * * *